July 25, 1950 R. C. EDSON ET AL 2,516,763

POWER LINE CARRIER FREQUENCY TELEPHONE SYSTEM

Filed Aug. 22, 1946 4 Sheets-Sheet 1

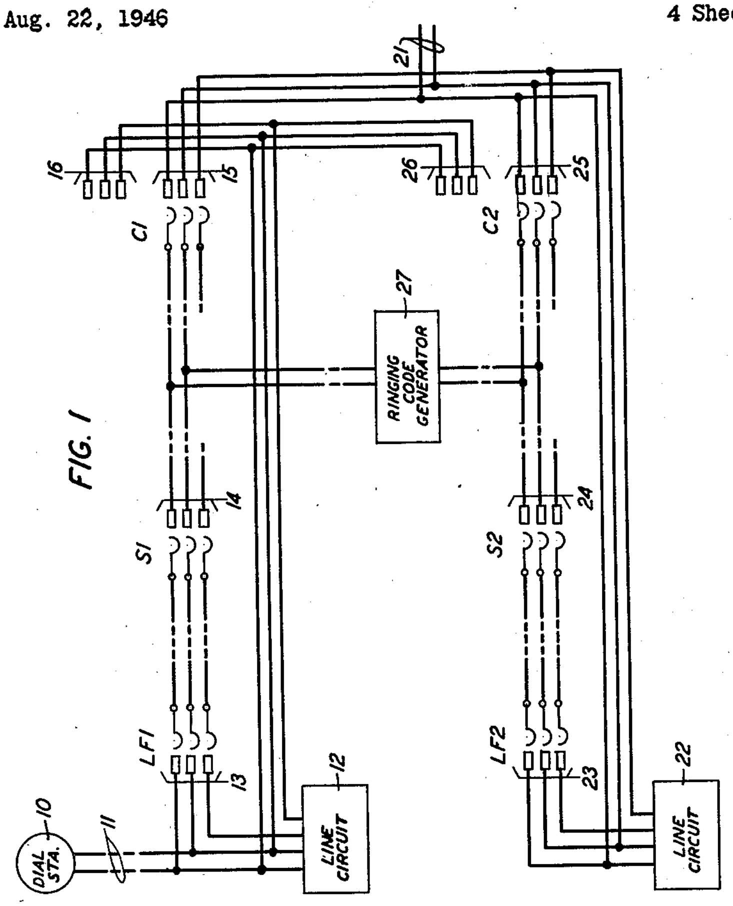

FIG. 1

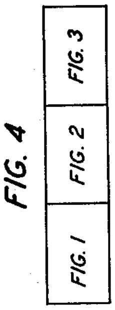

FIG. 4

FIG. 6

| FOUR PARTY SELECTIVE OR EIGHT PARTY SEMI-SELECTIVE RINGING | | | | | | | |
|---|---|---|---|---|---|---|---|
| | AT CONNECTOR | | AT CARRIER TERMINAL | | | | |
| STA. | CODE | POLARITY OF RING. CURRENT | RING OVER | RINGING RELAY OPERATED | OSC. OPERATED | FREQUENCY OF RING. IMPULSES TRANSMITTED | RING. IMPULSES SUPERIMPOSED ON POWER |
| 1 | 1 RING | ± − | TIP | 511 | OT1 | 30 I.P.S. | + HALF CYCLE |
| 2 | 1 RING | ± − | RING | 611 | OR1 | 30 I.P.S. | − HALF CYCLE |
| 3 | 1 RING | ± + | TIP | 512 | OT2 | 20 I.P.S. | + HALF CYCLE |
| 4 | 1 RING | ± + | RING | 612 | OR2 | 20 I.P.S. | − HALF CYCLE |
| 5 | 2 RING | ± − | TIP | 511 | OT1 | 30 I.P.S. | + HALF CYCLE |
| 6 | 2 RING | ± − | RING | 611 | OR1 | 30 I.P.S. | − HALF CYCLE |
| 7 | 2 RING | ± + | TIP | 512 | OT2 | 20 I.P.S. | + HALF CYCLE |
| 8 | 2 RING | ± + | RING | 612 | OR2 | 20 I.P.S. | − HALF CYCLE |

INVENTORS: R. C. EDSON
L. HOCHGRAF

BY R. O. Covell

ATTORNEY

July 25, 1950 R. C. EDSON ET AL 2,516,763

POWER LINE CARRIER FREQUENCY TELEPHONE SYSTEM

Filed Aug. 22, 1946 4 Sheets-Sheet 2

INVENTORS: R. C. EDSON
L. HOCHGRAF

BY R. O. Covell

ATTORNEY

July 25, 1950 R. C. EDSON ET AL 2,516,763

POWER LINE CARRIER FREQUENCY TELEPHONE SYSTEM

Filed Aug. 22, 1946 4 Sheets-Sheet 3

INVENTORS: R. C. EDSON
L. HOCHGRAF
BY
R. O. Covell
ATTORNEY

POWER LINE CARRIER FREQUENCY TELEPHONE SYSTEM

Filed Aug. 22, 1946 4 Sheets-Sheet 4

INVENTORS: R. C. EDSON
L. HOCHGRAF
BY
R. O. Covell
ATTORNEY

Patented July 25, 1950 2,516,763

UNITED STATES PATENT OFFICE 2,516,763

POWER LINE CARRIER FREQUENCY TELEPHONE SYSTEM

Robert C. Edson, Livingston, and Lester Hochgraf, Maplewood, N. J., assignors to Bell Telephone Laboratories, Incorporated, New York, N. Y., a corporation of New York Application August 22, 1946, Serial No. 692,350

16 Claims. (Cl. 179—2.5)

This invention relates to communication systems and particularly to telephone systems including subscribers' stations arranged for carrier current operation over a power transmission line.

Objects of the invention are the provision of carrier telephone service over power transmission lines, the provision of means for automatically marking the telephone lines which connect the power lines to a telephone central office busy on calls between telephone stations connected to the power lines, the elimination of manual control means heretofore provided at such stations for use only on such calls, the provision of means for applying divided code ringing to the station connected to the power line, the provision of means for applying semi-selective ringing to the stations, and in general the simplification and improvement of power line carrier telephone systems.

This invention embodies a telephone system in which a subscriber line terminating in a telephone central office of the system is common to a group of subscriber stations, each of which is connected to, and arranged for carrier current operation over, a transmission medium such as a power transmission line. A carrier terminal equipment unit is provided for connecting the subscriber line from the central office with the power transmission line. A first carrier frequency is used for the transmission of speech and signals from the central office over the power line to a calling or called one of these carrier subscriber stations; a second carrier frequency is used for the transmission of speech and signals from any one of the carrier stations to the central office and for the transmission of speech from a called one of the carrier stations on calls between stations of the group; and a third carrier frequency is used for the transmission of speech from a calling carrier station to the called carrier station on calls between stations of the group.

A feature of the invention is the provision of means, in carrier terminal equipment which interconnects a power transmission line and a telephone line from a telephone central office, for applying divided code ringing to the group of carrier telephone stations associated with the telephone line. According to this feature the arrangement is such that some of the stations are signaled by ringing current transmitted on positive half cycles of the power wave and the other stations are signaled by ringing current transmitted on negative half cycles of the power wave.

Another feature of the invention is the use of relaxation oscillators for controlling the application of energizing potential to the carrier transmitter at the carrier terminal, the operation of each of these oscillators being so controlled that the carrier transmitter is energized every second, third, or other chosen integral submultiple positive half cycle of the power wave or every second, third, or other chosen integral submultiple negative half cycle of the power wave, depending upon whether the ringing current is received at the carrier terminal equipment over the tip conductor or over the ring conductor of the telephone line from the telephone central office.

A clear and complete description of the invention will be facilitated by considering a system in which the invention and its features are embodied, such a system being represented schematically in the drawing. The invention is, however, not limited in its application to the particular system shown but is generally applicable to telephone systems.

The drawing, which consists of six figures, represents an automatic telephone exchange serving subscriber stations, some of which are arranged for carrier current operation over a power transmission line.

Fig. 1 shows an automatic telephone exchange comprising a subscriber's station 10, subscribers' lines 11 and 21, and line circuits 12 and 22, line-finder switches LF1 and LF2, selector switches S1 and S2, and connector switches C1 and C2.

Fig. 4 shows the relative position of Figs. 1 to 3 to form an operative arrangement;

Fig. 6 shows the kind of ringing and oscillator apparatus involved in ringing each of eight stations associated with the terminal shown in Fig. 5.

Figure 2:
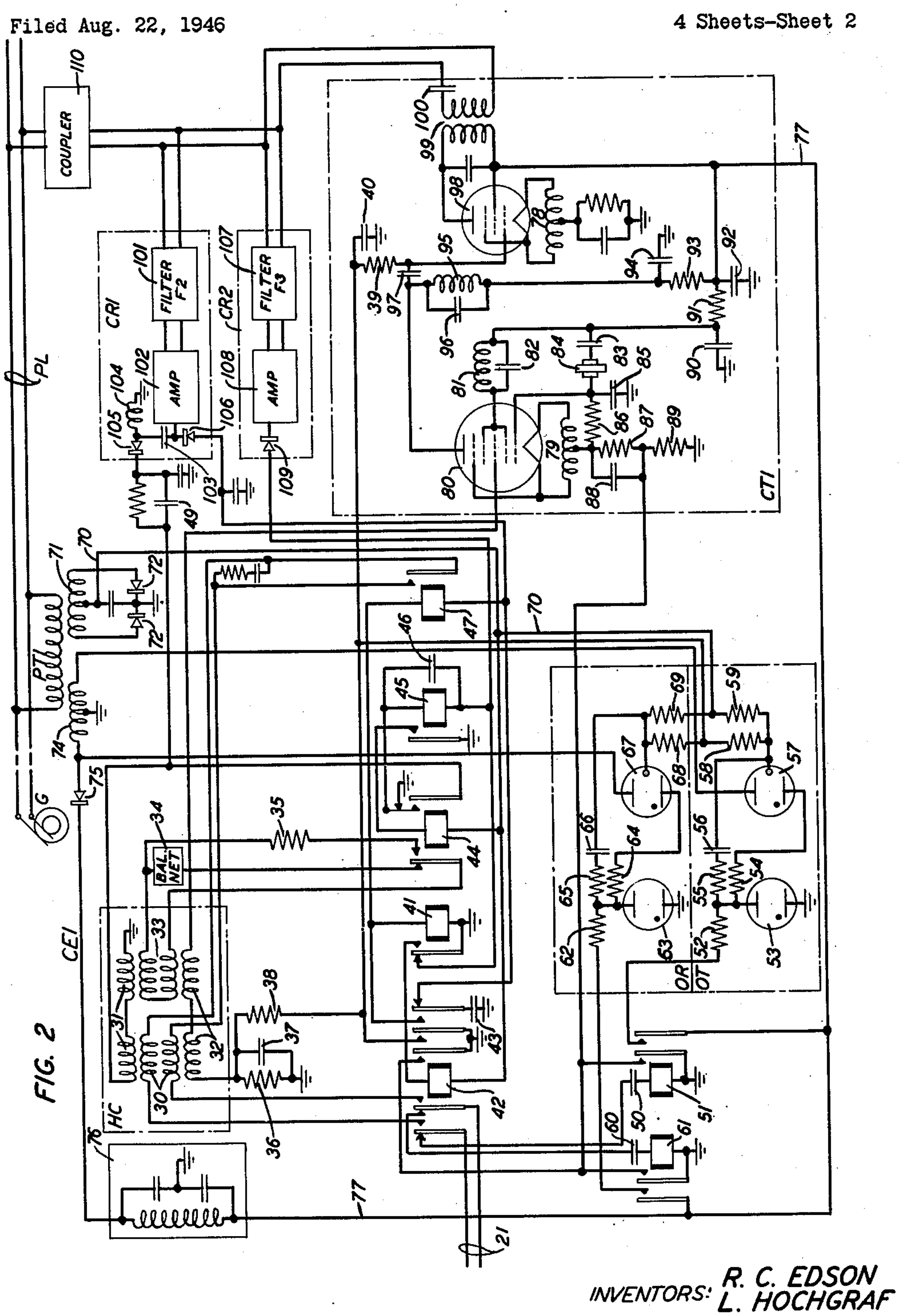
Fig. 2 shows carrier terminal equipment CE1 individual to the line 21, a power generator G, and a power transmission line PL to which the carrier terminal equipment CE1 is coupled by coupling means 110.

The subscriber's station 10 is of the usual type provided for use on lines terminating in an automatic central office and includes a dial or other impulse sender (not shown) for use in selectively controlling the switches through which desired connections are established. The line-finder, selector and connector switches may be of the two-motion, step-by-step type. Each of the line-finder and selector switches is represented in the drawing by a set of brushes and a single set of terminals and each of the connector switches is represented by a set of brushes and two sets of terminals. The relays and other apparatus associated with the line-finder, selector and connector switches are represented by broken lines. Reference may be had to Automatic Telephony, by Smith and Campbell, second edition, pages 53 to 65, inclusive, for a detailed description of the structures of such switches and their operation when used as selectors and connectors. Reference may be had to the patent to R. L. Stokely, No. 1,799,654, granted April 7, 1931, for a detailed disclosure of a line circuit and a line finder of the step-by-step type. The ringing code generator 27 comprises a source of ringing current and means for interrupting the ringing supply conductor as required to produce a plurality of different ringing codes for signaling subscribers' stations. Reference may be had to the patent to Duguid, No. 2,225,907, granted December 24, 1940, for a disclosure of such a ringing code generator and to the patent to Koechling, No. 2,289,503, granted July 14, 1942, for a detailed disclosure of a connector switch arranged for ten-party code ringing.

The carrier terminal equipment CE1 comprises a carrier current transmitter CT1, two carrier current receivers CR1 and CR2, a hybrid coil or group of transformer windings HC and a network 34 arranged to transmit signal and voice currents to and from line 21, ringing relays 51 and 61, two relaxation oscillators OT and OR, relays 41, 42, 44, 45 and 47, and a power transformer PT1 together with other pieces of apparatus including filters, rectifiers, condensers and resistances. The middle left pair of windings 30 of the hybrid coil HC are connected by normally open contacts of a control relay 42 to the conductors of line 21; and the closure of a direct current circuit through these windings in series with line 21 is under the control of relay 47. The middle right pair of windings 33 are normally connected in series with the balancing network 34 to balance the line 21; and a resistor 35 is provided for connection in place of the balancing network 34 on reverting calls. The upper pair of windings 31 of the hybrid coil receive voice frequency currents from the carrier receiver CR1 and the lower pair of winding 32 of the hybrid coil transmit voice frequency current from line 21 to the carrier transmitter CT1. The carrier receiver CR1 comprises a receiving filter 101, tuned to receive voice modulated and signal modulated carrier currents of a frequency F2 over the power line from any one of the carrier subscriber telephone stations associated therewith, an amplifier 102 and demodulators 105 and 106. The carrier receiver CR2 comprises a receiving filter 107, tuned to receive carrier current of a frequency F3 transmitted over the power line on a reverting call from the calling one of the carrier stations, an amplifier 108, and a demodulator 109.

The carrier transmitter CT1 comprises an oscillator-modulator tube 80 and an amplifier tube 98. The oscillator tube has associated therewith the tuned circuit comprising inductance 81, capacitor 82 and a piezo crystal 84 connected in circuit to generate oscillations at a desired carrier frequency F1. The tuned circuit has a high impedance at frequencies other than that of the crystal 84 so as to prevent oscillation at frequencies other than the desired carrier frequency which is determined by crystal 84. Since voice frequency current from telephone line 21 is transmitted to tube 80 through the lower pair of windings 32 of hybrid coil HC, the output current of tube 80 includes both modulated carrier and voice frequency components. The elements 96 and 95 have a high impedance at the carrier frequency and a low impedance at voice frequencies; and element 94 has a low impedance at the carrier frequency and at voice frequencies. The voice modulated carrier frequency output of tube 80 is impressed through condenser 97 on the control grid of amplifier tube 98; and the amplified carrier current is transmitted through transformer 99, condenser 100 and coupler 110 over the power line PL. The energy for operating tubes 80 and 98 and for operating the vacuum tubes of the carrier receivers CR1 and CR2 is obtained from the power line through a transformer PT1. Plate current for the vacuum tubes is supplied through part of winding 74 of transformer PT1, rectifier 75, filter 76, and conductor 77. Winding 74 also supplies alternating voltage to the upper element of each of tubes 57 and 67 of the relaxation oscillators to control the transmission of ringing signals over the power line to the carrier subscriber stations as hereinafter further described. Winding 71 of power transformer PT1, in combination with rectifiers 72, constitutes a source of negative potential for operating relays 42 and 44, and for biasing the grid of tube 98. The filaments of tubes 80 and 98 are heated by energy transmitted through windings 79 and 78 of power transformer PT1 these windings being shown adjacent the tubes. Other windings of power transformer PT1 supply the current for heating the filaments of the vacuum tubes of the carrier receivers CR1 and CR2. The carrier receivers are normally energized ready to receive signals but the bias normally provided for tubes 80 and 98 is such that there is normally substantially no current in the plate circuits of these tubes. When the transmission of carrier current of frequency F1 is desired, the operation of one of relays 42, 51 and 61 short circuits biasing resistor 89 to decrease the negative bias on the grid of tube 80; and the operation of relay 42 or the break-down of either one of gas-filled tubes 57 and 67 decreases the negative bias of tube 98 to increase the output of the amplifier. The operation of the carrier terminal equipment CE1 of Fig. 2 is hereinafter further described on calls to and from the carrier subscriber stations.

Each of the carrier subcriber stations comprises a carrier receiver CR3, a carrier transmitter CT3, a telephone handset 175 consisting of a receiver 176 and transmitter 177, a dial 170 for use in establishing connections through the central office, a ringer 156, relays 150 and 160, and power supply means comprising a power transformer PT3. The carrier receiver CR3, comprises filter units FL2 and FL3 which transmit current of carrier frequency F1 and suppress components of other frequencies, a carrier frequency amplifier tube 125, an interstage filter FL4, another amplifier tube 132, an output filter FL5, and a demodulator 147. The voice frequency component of the output of demodulator 147 operates the telephone receiver 176 and the direct current component of the output of demodulator 147 controls relay 150. Automatic control of the gain of tube 125 is provided from rectifier 141 of filter unit FL5. The carrier transmitter CT3 includes a transformer 166, connecting the telephone transmitter 177 to the input circuit of the amplifier and modulator 164, and includes two crystals 162 and 163 for controlling the frequency of the carrier current generated for transmission over the power line. Crystal 162 oscillates at the carrier frequency F2 and crystal 163 oscillates at the carrier frequency F3. Relay 160 switches the crystals 162 and 163. Winding 181 of power transformer PT3 supplies the energy for heating the filament of tube 125; and other windings (not shown) supply the current for heating the filament of tube 132 and the filaments of the vacum tubes of the carrier transmitter CT3. Winding 185 in combination with rectifier 190 supplies through conductor 193 the current for the plate circuits of all of the vacuum tubes at the subscriber station, and also the current for actuating ringer 156 and relay 160. Winding 185 also supplies alternating voltage to the screen grid of tube 132 for divided ringing control as hereinafter further described. The switch 174 associated with the receiver hook controls the energization of the carrier transmitter CT3 but the carrier receiver CR3 is continuously energized ready to respond to incoming signals.

*Call from central office to carrier subscriber station*

Figure 3:
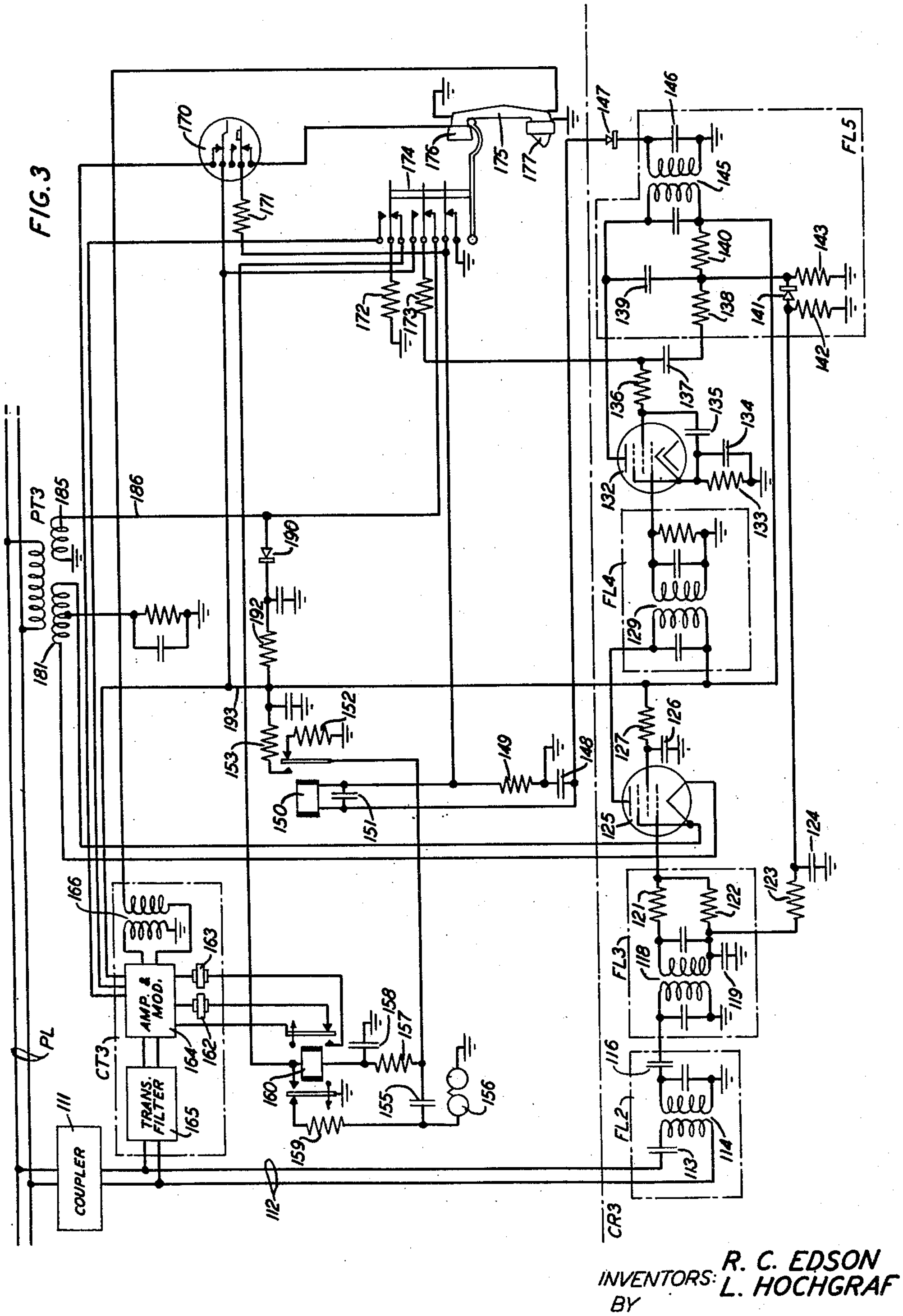
Fig. 3 shows one of a plurality of subscribers' stations connected to and arranged for carrier current operation over power line PL.

Assume now that a call is initiated at a subscriber station 10, that a line finder LF1 is operated to extend a connection from station 10 over line 11 to the first selector S1, that selector S1 is selectively operated responsive to the dialing of the first digit of the called subscriber's directory number by the calling subscriber at station 10, that the selector S1 extends the connection to an idle connector switch C1, and that the connector C1 is selectively controlled by the dialing of the last digits of the called subscriber's directory number to select the called line and to select the particular ringing code with which the called subscriber is signaled. Assume further that the called station is one of the carrier subscriber stations associated with carrier terminal CE1 and telephone line 21. A busy test of the line 21 is made and if the line tests idle, ringing current is transmitted over line 21. Although the connector switch may be arranged for either divided code ringing or bridged code ringing it will be assumed that the connector is arranged for divided code ringing; and the carrier terminal equipment CE1 and carrier subscriber stations shown in Figs. 2 and 3 are shown arranged for divided code ringing. The ringing current frequency may be 20 cycles per second and relays 51 and 61 are of a type which will operatively respond to current of such a frequency. If the called station is signaled over the tip conductor of line 21, the ringing current effects the operation of relay 51 of the carrier terminal equipment CE1 during each ringing interval of the selected ringing code; and, if the called station is signaled over the ring conductor of line 21, the ringing current effects the operation of relay 61 of the carrier terminal equipment CE1 during each ringing interval of the selected ringing code. The operation of either relay 51 or relay 61, responsive to ringing current transmitted over line 21, closes a short circuit across resistor 89 thereby reducing the grid bias of oscillator tube 80 of carrier transmitter CT1. The operation of relay 51 connects the plate supply conductor 77 to relaxation oscillator OT and the operation of relay 61 connects the plate supply conductor 77 to relaxation oscillator OR. The two relaxation oscillators OT and OR are made up of similar elements and operate in like manner. Assume that relay 51 is operated by the ringing current received over line 21 from connector C1. The operation of relay 51 closes a circuit for charging condenser 56, this circuit being traced from plate supply conductor 77, through a front contact of relay 51, resistors 52 and 55, condenser 56, resistor 59, conductor 70, winding 71 of power transformer PT1 and rectifiers 72 to ground. The charging of condenser 56 builds up a voltage across the control gap of gas-filled tube 57, a predetermined interval of time being required to charge condenser 56 to a voltage sufficient to ionize the control gap of tube 57. As soon thereafter as the winding 74 of power transformer PT1 is energized in a direction where renders the main anode of tube 57 positive with respect to ground potential, a discharge is started between the main anode and cathode of tube 57. The voltage drop through resistor 59 is thus increased so as to reduce the bias applied through resistors 58 and 39 to the grid of tube 98 and to reduce the bias applied through resistor 38 and windings 32 of hybrid coil HC to a grid of tube 80; whereby carrier current of frequency F1 is generated and transmitted through transformer 99 and coupler 110, over the power line to each of the carrier subscriber stations. As the potential of the cathode of tube 57 rises, the voltage applied through condenser 56 and resistor 55 to gas-filled tube 53 is increased until discharge occurs in gas-filled tube 53. The potential of the starter anode of tube 57 is reduced due to discharge in tube 53. When the power voltage begins to fall, so also does the potential of the main anode of tube 57; and, when this potential falls to a value which is insufficient to maintain a discharge between the main anode and cathode of tube 57, the discharge in tube 57 ceases, tube 53 is deenergized and the potential applied to the grids of the transmitter tubes 80 and 98 becomes sufficiently negative to terminate the transmission of carrier current of frequency F1 over the power line PL. The voltage between conductors 70 and 77, the capacity of condenser 56, and the resistance of element 55 are such that it takes a predetermined interval of time for the voltage across the control gap of tube 57 to reach the breakdown value. It is the function of tube 53 to stabilize the oscillator OT against variations in the supply voltages to the oscillator obtained from the power line. With tube 53 provided as shown, the voltage from which condenser 56 starts to recharge becomes lower as the supply voltage becomes higher; and the voltage from which condenser 56 starts to recharge becomes higher as the supply voltage becomes lower. The provision of tube 53 thus insures a very nearly constant time for the voltage cross the control gap of tube 57 to reach the breakdown value. During the interval which is measured by the charging of condenser 56, the winding 74 of power transformer PT1 will have been energized by a half cycle of opposite polarity and by another half cycle of power wave of the polarity which tends to make the main anode of tube 57 positive with respect to ground; but no impulse of carrier current of frequency F1 is transmitted during this period because at the time the anode of tube 57 becomes positive, the voltage across the control gap has not reached a value sufficient to effect breakdown. During the following half cycle of the power wave, while the main anode of tube 57 is negative with respect to ground, the voltage across condenser 56 increases sufficiently to effect ionization of the control gap; and as soon thereafter as the voltage induced in winding 74 once more makes the main anode of tube 57 sufficiently positive with respect to ground, the main gap of tube 57 is ionized and the transmitter CT1 is energized to transmit another impulse of carrier current of frequency F1. Thus every second positive half cycle of the power wave effects the breakdown of tube 57 as long as relay 51 remains operated. Thus, assuming the power line frequency to be 60 cycles per second, carrier current impulses of about 7 milliseconds duration are transmitted over the power line during each ringing interval of the ringing code transmitted from connector C1 over line 21 to relay 51, the impulses being transmitted over the power line at a rate of 30 impulses per second.

If ringing current is received over the ring conductor of line 21 instead of the tip conductor, relay 61 is operated instead of relay 51; and oscillator OR is energized in similar manner to that in which oscillator OT is energized as above described. The carrier transmitter CT1 is thereby energized to transmit carrier current impulses of frequency F1 over power line PL at a rate of 30 impulses per second during every second half cycle of the voltage wave induced in winding 74 of power transformer of the polarity opposite to that which effects the operation of oscillator OT. Thus when relay 51 is operated, half cycles of one polarity of the power wave cause the operation of oscillator OT to send ringing signal impulses of carrier current over power line PL; and when relay 61 is operated, half cycles of the other polarity of the power wave cause the operation of oscillator OR to send ringing signal impulses of carrier current over the power line.

In some cases, the central office may be arranged to transmit ringing current over one conductor of a line to ring the calling station at the same time that ringing current is being transmitted over the other conductor of the line to ring the called station. In such a case, both of relays 51 and 61 are operated at the same time and carrier current is transmitted during both the positive and negative halves of alternate cycles of the power voltage.

In case the connectors of the telephone central office are arranged for bridged code ringing instead of divided code ringing, both of relays 51 and 61 will be operated during each ringing interval. In such a case, by strapping the outer front contacts of relays 51 and 61 together, both relaxation oscillators will be actuated every second cycle of the power wave, one oscillator during the positive half cycle and the other oscillator during the negative half cycle so that the carrier transmitter CT1 will transmit impulses of carrier current of frequency F1 over line PL to operate the ringers at all of the carrier subscriber stations.

The ringing signal impulses of carrier current of frequency F1 generated by carrier transmitter CT1 responsive to ringing current incoming over line 21 to carrier terminal equipment CE1, are transmitted over power line PL to each of the carrier telephone subscriber stations. At each of these stations, the impulses of carrier current are further transmitted through a coupler 111, conductors 112, through condensers 113 and 116 and transformer 114 of filter unit FL2, and through transformer 118 and resistors 121 and 122 of filter unit FL3 to the control grid of amplifier tube 125. The amplified ringing signal impulses of carrier current in the output circuit of tube 125 are transmitted through transformer 129 of filter unit FL4 to the grid of amplifier tube 132. Although the filament of tube 132 is normally energized and positive potential supply conductor 193 is normally connected to the plate of tube 132, at each carrier subscriber station, the tube 132 at each station is normally effective to amplify the ringing signal impulses either only during half cycles of the power wave of one polarity or only during half cycles of the power wave of the opposite polarity. This is due to the fact that the potential of the screen grid is normally controlled by winding 185 of power transformer PT3, the connection between the grid of tube 132 and this winding being traced through resistors 136 and 173, a normally closed contact of switch 174, and conductor 186. Therefore at each of half of the carrier subscriber stations, the winding 185 of transformer PT3 makes the screen grid of the amplifier tube 132 positive during half cycles of the power wave of one polarity; and, at each of the other stations, the winding 185 of the power transformer PT3 makes the screen grid of the amplifier tube 132 positive during half cycles of the power wave of the opposite polarity. The selective enabling of amplifier tube 132 during one phase or the other of the power wave can be reversed if necessary at any station by interchanging the connections to the associated power supply transformer PT3. Thus at each of some of the stations, tube 132 will be able to amplify ringing current impulses received during one phase of the power wave; and at each of the other stations, tube 132 will be able to amplify ringing current impulses received during the opposite phase of the power wave. Since the carrier transmitter CT1 of terminal equipment CE1 transmits carrier current impulses only during one phase of the power wave if relay 51 is operated and only during the opposite phase of the power wave if relay 61 is operated, some of the stations are responsive to ringing signal carrier current impulses on any particular call. The stations which are signalled by carrier current impulses generated and transmitted responsive to the operation of relay 51 of carrier terminal equipment CE1 will thereafter be referred to as the tip stations, and the stations which are signalled by carrier current impulses generated and transmitted responsive to the operation of relay 61 of carrier terminal equipment CE1 will be referred to as the ring stations. At each of the stations at which tube 132 is enabled during the half cycles of the power wave on which the ringing signal carrier current impulses are superimposed on any particular call, tube 132 amplifies these impulses and the amplified impulses are transmitted through transformer 145 of filter unit FL5, rectifier 147, and through the winding of relay 150 in parallel with condenser 151, thence to ground at the lowermost normally closed contact of switch 174. Relay 150 is a sensitive relay and is alternately operated and released responsive to ringing signal impulses received at the rate of thirty impulses per second during each ringing interval of the ringing code with which the called station is identified. Each operation of relay 150 closes circuits for operating relay 160 and charging condenser 155. The circuit for operating relay 160 is traced from ground through winding 185 of power transformer PT3, conductor 186, rectifier 190, resistor 192, positive potential supply conductor 193, resistor 153, front contact of relay 150, resistor 157, winding of relay 160, uppermost back contact of switch 174, and resistor 172 to ground. The circuit for charging condenser 155 is traced from conductor 193 through resistor 153, front contact of relay 150, condenser 155, and through ringer 156 in parallel with resistor 159. Due to the shunt path through resistor 159, the current through ringer 156 is insufficient to tap the bell responsive to the first operation of relay 150. The operation of relay 160 closes a short circuit across the resistor 172 and back contact of switch 174, and opens the shunt path through resistor 159 to render ringer 156 operative responsive to succeeding operations of relay 150 during receipt of ringing signal impulses. Relay 160 is a slow-to-release relay and remains operated while relay 150 is responding to ringing signal carrier current impulses at a rate of 30 impulses per second. When relay 150 releases at the end of the first carrier current impulse, it closes a circuit through resistor 152 for discharging condenser 155. Each succeeding operation and release of relay 150 responsive to ringing signal carrier current impulses charges and discharges condenser 155 in series with ringer 156; and the ringer at each of the tip carrier subscriber stations is thus actuated in accordance with the ringing code of the called station. On a call on which ringing current is transmitted over the ring conductor of line 21, the ringer at each of the ring carrier subscriber stations is actuated in accordance with the ringing code of the called station.

When the receiver is removed from the hook at the called carrier telephone station, ground is connected through resistor 172 to reduce the bias of the vacuum tube of the carrier transmitter CT3, the short circuit across receiver 176 is opened, and the screen grid of tube 132 is transferred from the winding 185 to the plate supply conductor 193 so that tube 132 is no longer disabled during alternate half cycles of the power wave. The actuation of switch 174 upon removal of the receiver is also effective to close a circuit (not shown) for energizing the filament of the amplifier tube (not shown) of the carrier transmitter CT3. If the receiver is removed during a silent interval of the ringing code, relays 150 and 160 will not be operated, and with relay 160 normal crystal 162 is included in the frequency determining circuit of the oscillator of carrier transmitter CT3 and carrier circuit of frequency F2 is generated and transmitted through filter 165 over the power line PL. If, however, the receiver is removed while relays 150 and 160 are operated responsive to ringing signal impulses, crystal 163 is included in the frequency determining circuit of the oscillator of carrier transmitter CT3; but relays 150 and 160 release during the next silent interval of the ringing cycle and crystal 162 is thereupon connected in the frequency determining circuit of carrier transmitter CT3 to effect the transmission of carrier current of frequency F2.

The carrier current of frequency F2 transmitted from the answering carrier subscriber station over line PL does not affect the carrier receivers at the other carrier subscriber stations, since filter units FL2 and FL3 are tuned to pass a carrier band including frequency F1 but excluding frequencies F2 and F3. Since the receiving filter 101 of carrier receiver CR1 at the carrier terminal CE1 is tuned to pass a band including frequency F2, the carrier current of this frequency transmitted from the answering carrier station passes through coupler 110 and receiving filter 101 of carrier receiver CR1 of the carrier terminal equipment CE1, to the input circuit of amplifier 102. Rectifier element 106 transmits a part of the output of amplifier 102 to effect the energization of the windings of relays 47 and 41 in series; and rectifier element 105 transmits voice frequency components in the output circuit of amplifier 102 through condenser 49 and windings 31 of hybrid coil HC. The operation of relays 47 and 41 by the rectified carrier current of frequency F2 is delayed for a predetermined interval of time, while condenser 43 is charging to prevent operation of the relays by static or other momentary disturbances on line PL. The operation of relay 41 opens a normally closed short circuit across relay 45 and closes a circuit for operating relay 42. The operation of relay 42 connects the conductors of line 21 to windings 30 of hybrid coil HC; and with relay 47 also operated these windings are connected in series across the conductors of line 21 to cause the operation of the ringing trip relay (not shown) of the connector C1 and the closing of the talking path through the connector between the calling station 10 and line 21. The aforementioned operation of relay 42 closes a short circuit across resistor 89 to reduce the grid bias of tube 80 and closes a short circuit across resistors 38 and 36 to reduce the grid bias of tube 98 so that carrier current of frequency F1 is transmitted through transformer 100 and coupler 110 over power line PL. Voice currents incoming over line 21 from the calling station 10 are impressed through windings 30 and 32 of hybrid coil HC on a grid of tube 80 thereby to modulate the carrier current of frequency F1 being transmitted over the power line. Thus two-way transmission between station 10 and the called carrier station is effected and the connection is maintained until released at the calling and called stations. When the handset is replaced on the hook at the called carrier subscriber station, the switch 174 is restored to normal thereby deenergizing carrier transmitter CT3; but relays 150 and 160 remain operated at each of the carrier stations until carrier transmitter CT1 of the carrier terminal equipment is also deenergized. When the transmission of carrier current of frequency F2 from carrier transmitter CT3 ceases, relays 47 and 41 of the carrier terminal equipment CE1 releases. The release of relay 47 opens the bridge across the conductors of line 21 and the release of relay 41 causes the release of relay 42. The release of relay 42 reconnects line 21 to ringing relays 51 and 61, opens the short circuit across biasing resistor 89 and opens the short circuit across biasing resistors 38 and 36 whereby the transmission of carrier current of frequency F1 from transmitter CT1 is ended and relays 150 and 160 at each of the carrier subscriber stations are released. The line-finder LF1 and selector S1 are restored to normal in usual and well-known manner when the receiver is replaced at the calling station 10.

*Call from carrier subscriber station to station 10*

Assume now that the handset 175 is removed from the receiver hook at one of the carrier subscriber stations to initiate a call to station 10. When switch 174 is actuated by removal of the handset, carrier transmitter CT3 is energized in the manner above described to transmit carrier current of frequency F2 over the power line. This carrier current does not effect the operation of relay 150 at any of the carrier subscriber stations because the input filters of carrier receivers CR3 are tuned to pass a band which does not include frequency F2. At the carrier terminal equipment CE1, the carrier current of frequency F2 passes through filter 101 of carrier receiver CR1 and effects the operation of relays 47 and 41. The operation of relay 41 causes the operation of relay 42; and, with both of relays 47 and 42 operated the windings 30 of hybrid coil HC are connected in series with the conductors of line 21 to cause the operation of the line relay (not shown) of line circuit 22, and a line-finder LF2 is thereupon operated to extend the calling line 21 to a first selector S2. The aforementioned operation of relay 42 also reduced the bias of tubes 80 and 98 in the manner hereinbefore described to cause carrier transmitter CT1 to transmit carrier current of frequency F1 over power line PL. This carrier current is modulated by dial tone transmitted from selector S2 through line-finder LF2, line 21 and windings 30 and 32 of hybrid coil HC to the input circuit of tube 80. When the calling subscriber hears the dial tone, the directory number of the called station 10 is dialed. The circuit through receiver 176 is opened at the off-normal contacts of dial 170; and the impulse contacts of the dial open and close the connection between plate supply conductor 193 and amplifier-modulator 164 of carrier transmitter CT3 to transmit a train of dial impulses corresponding to each digit dialed, each dial impulse being transmitted as an interruption of the carrier current of frequency F2. With relay 42 of carrier terminal equipment CT operated, condenser 43 is connected in parallel with the winding of relay 41 alone, so that relay 47 becomes fast in operating and releasing and relay 41 becomes slow in releasing; so that relay 41 remains operated during the receipt of dial impulses but relay 47 is released and reoperated responsive to each impulse. Each release of relay 47 opens the bridge across the conductors of line 21. The first train of dial impulses is thus repeated over line 21 to effect the selective operation of selector S2. The connection is extended by the operation of selector S2 to an idle conductor C2 having access to the called line. The remaining digits dialed by the calling subscriber effect the selective operation of connector C2 to connect with the called line 11 and to select the ringing code with which station 10 is signaled. The connector C2 makes the usual busy test and if line 11 is idle, the selected ringing code is transmitted over line 11 to signal the called subscriber. When the called subscriber answers, the ringing trip relay (not shown) of connector C2 is operated to terminate the ringing and the talking connection is established between lines 21 and 11. Voice currents from transmitter 177 of handset 175 modulate the carrier current of frequency F2 transmitted over the power line PL from the calling station; and the carrier receiver CR1 transmits these voice currents through demodulator 105, condenser 49, windings 31 and 30 of hybrid coil HC, over line 21, through line-finder LF2, selector S2, connector C2 and line 11 to the called station 10. Voice currents from station 10 are transmitted over line 11, through connector C2, selector S1, line-finder LF1, line 21, and windings 30 and 32 of hybrid coil HC to modulate the carrier current of frequency F1 being transmitted over power line PL; and the carrier receiver CR3 at the calling carrier subscriber station transmits the voice currents through rectifier 147, condenser 151 and resistor 171 to telephone receiver 176.

The connection is maintained until the handset 175 is replaced on the receiver hook at the calling station, at which time, the carrier transmitter CT3 is deenergized causing the release of relays 47, 41 and 42 of carrier terminal equipment CE1. The release of relay 47 opens the bridge across the conductors of line 21 whereby the connector C2, selector S2 and line-finder LF2 are restored to normal in usual and well-known manner. The release of relay 42 deenergizes the carrier transmitter CT1 to stop the transmission of carrier current of frequency F1 over line PL and relays 150 and 160 are thereby released at each of the carrier subscriber stations.

*Reverting call*

A call from one of the carrier subscriber stations to another of these stations on the same line and using the same carrier frequencies is known as a reverting call. Such a call is initiated in the same manner as any other call and the removal of the handset and operation of the dial at the calling station effect the operation of a line-finder LF2, selector S2 and connector C2 to connect with the called line. The connector C2 is arranged to make a reverting call test in case the called line is found busy when connection is made therewith. A connector arranged to make a reverting call test is disclosed in the patent to H. Hovland, No. 1,849,087, granted March 15, 1932. Busy tone is transmitted from the connector C2 to the calling station and the subscriber thereat thus restores the handset to normal to permit ringing of the called station. When the handset is restored to normal at the calling station, carrier transmitter CT3 is deenergized and the transmission of carrier current of frequency F2 over line PL is terminated thereby causing the release of relays 47, 41 and 42 of carrier terminal CE1. The bridge across the conductors of line 21 is opened by the release of relay 47 and the connector C2 then makes the revertive busy test above mentioned. Since the call being described is a reverting call, the connector finds that the called line 21 is also the calling line and the line-finder LF2 and selector S2 are thereupon restored to normal. The connector C2 is held however with its brushes in engagement with the terminals to which line 21 is connected and ringing current is transmitted according to the selected ringing code over either the tip or the ring conductor of line 21 depending on whether the called station is a tip station or a ring station. The one or the other of ringing relays 51 and 61 is operated by the ringing current to effect the transmission of impulses of carrier current of frequency F1 from carrier transmitter CT1 over the power line PL to actuate the ringers at all of the tip stations if the called station is a tip station or to actuate the ringers at all of the ring stations if the called station is a ring station. If the calling station is not signaled on the same side of the line 21 as is the called station, a short impulse of ringing current is transmitted at the end of each ringing code cycle to effect a short operation of the ringer at the calling station so that the calling party will know, when ringing ceases, that the call has been answered.

When the handset is removed from the receiver hook at the called station to answer the call, carrier transmitter CT3 will be energized to transmit carrier current of frequency F2 over the power line PL, thereby operating relays 47 and 41 of the carrier terminal equipment CE1. Relay 41 operates relay 42 and with relays 47 and 42 both operated windings 30 of hybrid coil HC are bridged across the conductors of line 21 to effect the operation of the ringing trip relay (not shown) of connector C2. The transmission of ringing current is thereby stopped and the brushes of connector C2 remain in engagement with the terminals of line 21 as long as the bridge is maintained across the conductors of line 21. With relay 42 operated, carrier transmitter CT1 is energized to transmit carrier current of frequency F1, thereby operating relays 150 and 160 at each of the carrier subscriber stations. When the subscriber at the calling station realizes the ringer is no longer being actuated, the handset is removed for conversation with the subscriber at the called station. Although the operating circuit of relay 160 is opened when the switch 174 is actuated by removal of the receiver at the calling station, relay 160 is held operated independent of the switch 174 as long as relay 150 remains operated. With relay 160 operated crystal 163 is included in the frequency determining circuit of the oscillator tube of transmitter CT3, and energization of the carrier transmitter by the actuation of switch 174 causes the transmission of carrier current of frequency F3 over the power line PL. The carrier current of frequency F3 thus transmitted over line PL is without effect at any of the carrier subscriber stations but at the carrier terminal CE1, this current passes through filter 107 of carrier receiver CR2 to amplifier 108. The current in the output circuit of amplifier 108 is demodulated by rectifier 109; and since the short circuit across the winding of relay 45 has been opened by the operation of relay 41 responsive to carrier current of frequency F2 received over line PL from the called carrier subscriber station, relay 45 is operatively energized. Relay 45 closes a circuit for operating relay 44. The operation of relay 44 opens the operating circuit of relay 45 and connects the output of demodulator 109 to windings 31 of hybrid coil HC. Conversation between the calling and called stations is thus enabled, voice currents from the telephone transmitter 177 at the called station being effective to modulate the carrier current of frequency F2 transmitted from the associated carrier transmitter CT3 over line PL to carrier receiver CR1 of the carrier terminal CE1. The voice current components of the carrier current of frequency F2 received from the called station are transmitted through demodulator 105, condenser 49 and windings 31 and 32 of hybrid coil HC to modulate the carrier current of frequency F1 transmitted from carrier transmitter CT1 over line PL to both the calling and called carrier subscriber stations. The voice currents from the telephone transmitter 177 at the calling station modulate the carrier current of frequency F3 transmitted from the associated carrier transmitter CT3 over line PL to carrier receiver CR2 of the carrier terminal CT. The voice current components of the carrier current of frequency F3 received from the calling station are transmitted through demodulator 109, windings 31 and 32 of hybrid coil HC to modulate the carrier current of frequency F1 transmitted from carrier transmitter CT1 over line PL to both the calling and called carrier subscriber stations.

If the calling subscriber restores the handset to normal at the same time or before the handset is restored at the called station; the associated carrier transmitter is deenergized to terminate the transmission of carrier current of frequency F3, relay 45 of carrier terminal CT being thereby released. When the carrier transmitter at the called station is also deenergized, the transmission of carrier current of frequency F2 is terminated thereby causing the release of relays 47, 41 and 42 of carrier terminal CE1. The release of relay 42 deenergizes carrier transmitter CT1 thereby causing the release of relays 150 and 160 at each of the carrier subscriber stations. The release of relay 47 opens the bridge across line 21 thereby causing the connector C2 to be restored to normal in usual manner.

If the handset is restored to normal at the called station before the connection is released at the calling station, the deenergization of the carrier transmitter at the called station causes the release of relays 47 and 41 of carrier terminal CE1. The release of relay 47 opens the bridge across the conductors of line 21 and the release of relay 41 causes the release of relay 42. The release of relay 42 restores the normal grid bias of the carrier transmitter tube to terminate the transmission of carrier current of frequency F1 over line PL and thereby release relays 150 and 160 at each of the carrier subscriber stations. The release of relay 160 at the calling station at which the receiver has not yet been replaced on the receiver hook, changes the tuning of carrier transmitter CT3 by inserting crystal 162 in place of crystal 163 in the frequency determining circuit of the oscillator so that the carrier current transmitted therefrom is changed from frequency F3 to frequency F2. This change in the frequency of the carrier circuit transmitted over line PL from the calling station causes the release of relays 45 and 44 and the reoperation of relays 47, 41 and 42 of carrier terminal CE1. The reoperation of relays 47 and 42 again closes the bridge across the conductors of line 21. If the interval during which relays 47 and 42 were released is sufficiently long the connector switch C2 is at the time restored to normal; and in such a case the reclosing of the bridge effects the operation of the line relay of line 21 and the starting of a line finder. The reoperation of relay 42 again energizes carrier transmitter CT1 so that carrier current of frequency F1 is again transmitted over line PL, operating relays 150 and 160 at all carrier subscriber stations except the calling station at which relay 150 is operated but the circuit for operating relay 160 is open at a contact of switch 174. When the handset is replaced at the calling station the carrier transmitter CT3 is deenergized causing the release of relays 47, 41 and 42 at the carrier terminal CE1. The release of relay 47 again opens the bridge across the conductors of line 21 thereby to effect the return of connector C2 to normal, if not already returned to normal; or if connector C2 was returned to normal before the carrier transmitter at the calling station started to transmit carrier current of frequency F2, the opening of the bridge across the conductors of line 21 causes the release of the line-finder which was operated to connect the line 21 after the connector C2 was released.

Figure 5:
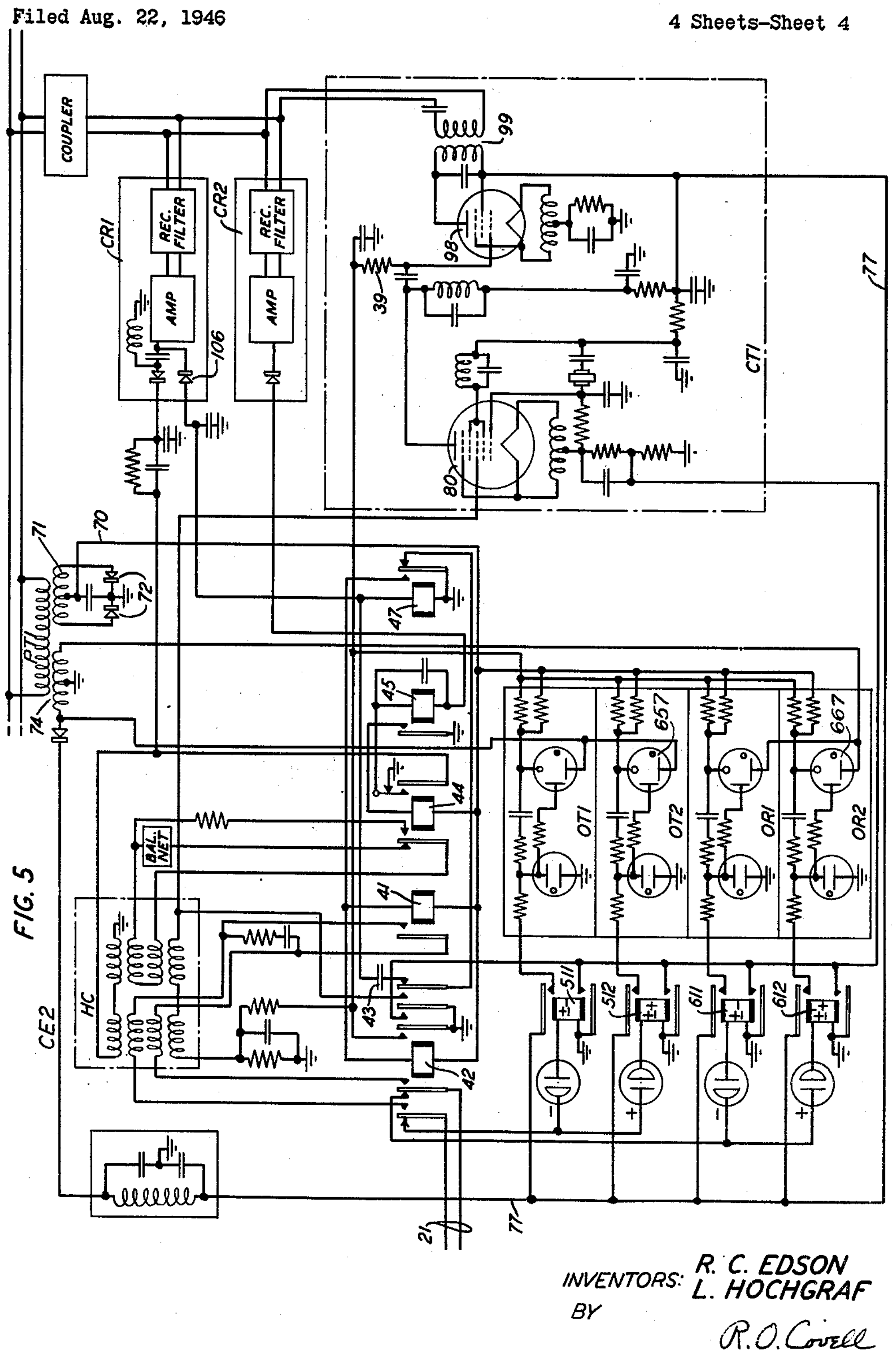
Fig. 5 shows carrier terminal equipment CE2 arranged for four-party selective or eight-party semi-selective ringing.

The carrier transmitter CE2 shown in Fig. 5 is similar to carrier terminal CE1 shown in Fig. 2 except that it is arranged to receive four-party selective or eight-party semi-selective superimposed ringing from the central office and except that the arrangement of relays 41, 42 and 47 has been modified as hereinafter described. Reference may be had to the patent to H. Hovland, 1,849,088, granted March 15, 1932, for disclosure of a connector arranged for four and eight-party superimposed ringing. Four ringing relays are provided in carrier terminal CE2, relays 511 and 512 for response to ringing current received over the tip conductor of line 21 and relays 611 and 612 for response to ringing current received over the ring conductor of line 21. The windings of each of the ringing relays is connected to the line conductors through a two-element gas-filled tube, relays 511 and 611 being thereby polarized to respond to ±− ringing current and relays 512 and 612 to respond to ±+ ringing current. Four relaxation oscillators OT1, OT2, OR1 and OR2 are provided one for each of relays 511, 512, 611 and 612. Oscillators OT1 and OR1 are identical with oscillators OT and OR of the carrier terminal CE1 shown in Fig. 2; and oscillators OT2 and OR2 are similar except that in each of these the values of the capacity and resistances which control the time required for impressing the breakdown voltage across the control gap of the three-element gas-filled tubes 657 and 667 are such that the main gap of tube 657 becomes ionized every third positive half cycle of the power voltage and the main gap of tube 667 becomes ionized every third negative half cycle of the power voltage. Thus, assuming the power supply frequency to be 60 cycles per second, the carrier transmitter CT1 is energized to transmit ringing signal carrier current impulses at the rate of 30 impulses per second when ringing relay 511 or 611 and the associated oscillator OT1 or OR1 are energized; and to transmit ringing signal carrier current impulses at the rate of 20 impulses per second when ringing relay 512 or 612 and the associated oscillator OT2 or OR2 are energized.

In order to insure against bell tapping at carrier subscriber stations, due to modulation of the carrier transmitted from carrier transmitter CT1 during the repeating of dial impulses from a calling carrier station to the central office, the arrangement of relays 41, 42 and 47 differs from that shown in Fig. 2. Relay 47 alone is energized in series with rectifier 106 responsive to carrier current incoming to receiver CR1 from the calling carrier station. Relay 47 controls both relay 41 and relay 42, relay 41 being fast to follow dial impulses and relay 42 being slow to release so as to remain operated during dialing. The operation of relay 42 connects the grid of tube 80 to the back contact of relay 47. Each release of relay 47 grounds the grid of tube 80 to maintain the output of tubes 80 and 99 substantially constant at a time when transients may be created by the opening of the loop across the telephone line 21. Otherwise such transients might vary the potential of the grid of tube 80 sufficiently to cause bell tapping at the carrier subscriber stations other than the calling station. However, by grounding the grid of tube 80 when relay 47 releases, the carrier current being transmitted from transmitter CT1 remains substantially constant during dialing. The windings of the hybrid coil are so connected and the central office battery is so poled that the grid of tube 80 may become more positive when the loop over the telephone line is closed at the end of each dial impulse, but the increase of carrier current which results is not sufficient to cause bell tapping.

The carrier subscriber stations arranged for four-party selective and eight-party semi-selective superimposed ringing are schematically represented by the station shown in Fig. 3. The difference between stations arranged for divided code ringing and stations arranged for four-party selective and eight-party semi-selective ringing is that the ringers at stations arranged for four and eight-party ringing are tuned to respond either to carrier impulses incoming at the rate of 30 impulses per second or to carrier impulses incoming at the rate of 20 impulses per second. When there are only four stations, each station is signaled by a one-ring code; and when there are eight stations, the four additional stations are signaled by a two-ring code. Fig. 6 shows the various ringing conditions established by the connectors in the central office for four and eight-party ringing, and shows the ringing relays and oscillators of the carrier terminal which are energized and the frequency of the ringing signal carrier current impulses for ringing each station.

What is claimed is:

1. In a telephone system, subscriber lines including party lines, a plurality of subscriber stations connected to each of said party lines, means for connecting calling and called lines, means for transmitting ringing current over one conductor of a called party line to ring certain of the stations on the line and for transmitting ringing current over the other conductor to ring the other stations on the line, a power line, a plurality of telephone stations connected to said power line, each of said power line stations arranged for carrier current operation over said power line, carrier terminal equipment connecting said power line to one of said party lines, and means including means in said carrier terminal equipment and means at each of said power line stations for ringing certain of said power line stations when ringing current is received by said carrier terminal equipment over one conductor of said one party line and for ringing the other power line stations when ringing current is received by said carrier terminal equipment over the other conductor of said one party line.

2. In a signaling system, a carrier current transmitter, a plurality of carrier current receivers each including signal means, a transmission medium common to said transmitter and receivers for transmitting carrier current from said transmitter to all of said receivers, means for impressing an alternating current control voltage on said medium, a first control means for rendering said transmitter effective to transmit carrier current of a particular frequency over said medium, a second control means for rendering said transmitter effective to transmit carrier current of said particular frequency over said medium, means for selectively rendering either said first control means or said second control means effective to control said transmitter, a third control means in each of some of said receivers for rendering the receiver effective to actuate the associated signal means responsive to carrier current of said particular frequency transmitted over said medium, a fourth control means in each of the remainder of said receivers for rendering the receiver effective to actuate the associated signal means responsive to carrier current of said particular frequency transmitted over said medium, means responsive to alternate half cycles of one polarity of said control voltage for rendering said first and third control means effective, and means responsive to alternate half cycles of the opposite polarity of said control voltage for rendering said second and fourth control means effective.

3. In a signaling system, a carrier current transmitter arranged to transmit carrier current of a particular frequency, a plurality of carrier current receivers each including individual signal means, a transmission medium common to said transmitter and receivers for transmitting carrier current from said transmitter to all of said receivers, means for impressing an alternating current control voltage on said medium, a first control means for rendering said transmitter effective to transmit carrier current over said medium, a second control means for rendering said transmitter effective to transmit carrier current over said medium, a third control means for rendering said transmitter effective to transmit carrier current over said medium, a fourth control means in each of some of said carrier receivers for rendering the receiver effective to actuate the associated signal means responsive to carrier current of said particular frequency incoming over said medium, a fifth control means in each of the remainder of said carrier receivers for rendering the receiver effective to actuate the associated signal means responsive to carrier current of said particular frequency incoming over said medium, means responsive to half cycles of one polarity of said control voltage for rendering said first and fourth control means operative, means responsive to half cycles of the opposite polarity for rendering said second and fifth control means effective, and means for operating said third control means independent of the polarity of said control voltage.

4. In a signaling system, a carrier current transmitter comprising an amplifier and arranged to transmit carrier current of a particular frequency, a plurality of carrier current receivers each comprising an amplifier and a signal device for operation responsive to carrier current of said particular frequency incoming to the receiver, a transmission medium common to said transmitter and receivers for transmitting carrier current from said transmitter to all of said receivers, means for impressing an alternating current control voltage on said medium, means normally biasing the amplifier of said carrier transmitter to prevent the transmission of carrier current over said medium, a first control means operatively responsive to alternate half cycles of one polarity of said control voltage for rendering said amplifier effective to transmit carrier current, a second control means operatively responsive to alternate half cycles of the opposite polarity of said control voltage for rendering said amplifier effective to transmit carrier current, means for selectively placing the one or the other of said control means in control of said transmitter, means in each of some of said receivers for rendering the amplifier therein effective responsive to half cycles of said one polarity of said control voltage to amplify carrier current of said particular frequency incoming over said medium thereby to operate the associated signal device, and means in each of the remainder of said receivers for rendering the amplifier therein effective responsive to half cycles of said opposite polarity of said control voltage to amplify carrier current of said particular frequency incoming over said medium thereby to operate the associated signal device.

5. In a telephone system, a voice frequency telephone line comprising two conductors, a power transmission line, a plurality of telephone subscriber stations connected to said power line, carrier terminal equipment individual to said lines comprising a carrier current transmitter for transmitting carrier current over said power line, means for selectively impressing a desired one of a plurality of ringing codes on the one or the other of said conductors to signal a called one of said stations, a first ringing relay connected to one of said conductors for response to ringing codes transmitted thereover, a second ringing relay connected to the other of said conductors for response to ringing codes transmitted thereover, a first relaxation oscillator comprising a three element gas-filled tube operative while said first ringing relay is operated, a second relaxation oscillator comprising a three element gas-filled tube operative while said second ringing relay is operated, an oscillator in said carrier transmitter rendered operative while either one of said ringing relays is operated, a vacuum tube amplifier in said carrier transmitter normally biased to prevent the transmission of carrier current from said oscillator over said power line, means including a transformer winding energized by said power line and timing means associated with the gas-filled tube of said first oscillator for effecting discharge of the gas-filled tube during alternate half cycles of one polarity of the power line voltage, means including a transformer winding energized by said power line and timing means associated with the gas-filled tube of said second oscillator for effecting discharge of the gas-filled tube during alternate half cycles of the opposite polarity of the power line voltage, means for decreasing the bias of said amplifier when either of said gas-filled tubes is energized thereby to render said amplifier effective to transmit carrier current over said power line, each of said subscriber telephone stations comprising carrier current receiving means including a vacuum tube amplifier and a detector and a signal device energized by carrier current incoming over said power line from said carrier transmitter, means at each of some of said subscriber stations comprising a transformer winding energized by the power line for rendering the amplifier of the carrier receiver operatively responsive to carrier current superimposed on half cycles of the power line voltage of said one polarity, means at each of the others of said subscriber stations comprising a transformer winding energized by the power line for rendering the amplifier of the carrier receiver operatively responsive to carrier current superimposed on half cycles of the power line voltage of said opposite polarity, and signal means at each of said carrier stations energized by the energization of the signal device responsive to impulses of carrier current received over said power line while the amplifier thereat is operative.

6. In a signaling system, a carrier current transmitter, a plurality of carrier current receivers, each of said receivers including individual signal means, a power line common to said transmitter and receivers, means for controlling said carrier transmitter to transmit carrier current through said power line to all of said receivers only during half cycles of one polarity of the power line voltage, means for controlling said carrier transmitter to transmit carrier current through said power line to all of said receivers only during half cycles of the opposite polarity of said power line voltage, means for controlling said carrier transmitter to transmit carrier current through said power line to all of said receivers during half cycles of both polarities of the power line voltage, means in each of some but not all of said receivers for actuating the associated signal means responsive only to carrier current received through said medium during half cycles of said one polarity of the power line voltage, and means in each of the remainder of said receivers for actuating the associated signal means responsive only to carrier current received through said medium during half cycles of said opposite polarity of the power line voltage.

7. In a signaling system, a carrier current transmitter, a plurality of carrier current receivers each including signal means, a transmission medium common to said transmitter and receivers for transmitting carrier current from said transmitter to all of said receivers, means for impressing an alternating current control voltage on said medium, a first control means for rendering said transmitter effective to transmit carrier current over said medium, a second control means for rendering said transmitter effective to transmit carrier current over said medium, means for selectively rendering either said first control means or said second control means, or both said first and second control means at one time, effective to control said transmitter, a third control means in each of some of said receivers for rendering the receiver effective to actuate the associated signal means responsive to carrier current transmitted over said medium, a fourth control means in each of the remainder of said receivers for rendering the receiver effective to actuate the associated signal means responsive to carrier current transmitted over said medium, means responsive to alternate half cycles of one polarity of said control voltage for rendering said first and third control means effective, and means responsive to alternate half cycles of the opposite polarity of said control voltage for rendering said second and fourth control means effective.

8. In a signaling system, a carrier current transmitter comprising an amplifier, a plurality of carrier current receivers each comprising an amplifier and a signal device for operation responsive to carrier current incoming to the receiver, a transmission medium common to said transmitter and receivers for transmitting carrier current from said transmitter to all of said receivers, means for impressing an alternating current control voltage on said medium, means normally biasing the amplifier of said carrier transmitter to prevent the transmission of carrier current over said medium, a first control means operatively responsive to alternate half cycles of one polarity of said control voltage for rendering said amplifier effective to transmit carrier current, a second control means operatively responsive to alternate half cycles of the opposite polarity of said control voltage for rendering said amplifier effective to transmit carrier current, means for selectively placing the one or the other or both of said control means in control of said transmitter, means in each of some of said receivers for rendering the amplifier therein effective responsive to half cycles of said one polarity of said control voltage to amplify carrier current incoming over said medium thereby to operate the associated signal device, and means in each of the remainder of said receivers for rendering the amplifier therein effective responsive to half cycles of said opposite polarity of said control voltage to amplify carrier current incoming over said medium thereby to operate the associated signal device.

9. In a telephone system, a voice frequency telephone line comprising two conductors, a power transmission line, a plurality of telephone subscriber stations connected to said power line, carrier terminal equipment individual to said lines comprising a carrier current transmitter for transmitting carrier current over said power line, means for selectively impressing a desired one of a plurality of ringing codes on the one or the other of said conductors to signal a called one of said stations, a first ringing relay connected to one of said conductors for response to ringing codes transmitted thereover, a second ringing relay connected to the other of said conductors for response to ringing codes transmitted thereover, a first relaxation oscillator comprising a three element gas-filled tube operative while said first ringing relay is operated, a second relaxation oscillator comprising a three element gas-filled tube operative while said second ringing relay is operated, an oscillator in said carrier transmitter rendered operative while either one or both of said ringing relays is operated, a vacuum tube amplifier in said carrier transmitter normally biased to prevent the transmission of carrier current from said oscillator over said power line, means including a transformer winding energized by said power line and timing means associated with the gas-filled tube of said first oscillator for effecting discharge of the gas-filled tube during alternate half cycles of one polarity of the power line voltage, means including a transformer winding energized by said power line and timing means associated with the gas-filled tube of said second oscillator for effecting discharge of the gas-filled tube during alternate half cycles of the opposite polarity of the power line voltage, means for decreasing the bias of said amplifier when either or both of said gas-filled tubes is energized thereby to render said amplifier effective to transmit carrier current over said power line, each of said subscriber telephone stations comprising carrier current receiving means including a vacuum tube amplifier and a detector and a signal device energized by carrier current incoming over said power line from said carrier transmitter, means at each of some of said subscriber stations comprising a transformer winding energized by the power line for rendering the amplifier of the carrier receiver operatively responsive to carrier current superimposed on half cycles of the power line voltage of said one polarity, means at each of the others of said subscriber stations comprising a transformer winding energized by the power line for rendering the amplifier of the carrier receiver operatively responsive to carrier current superimposed on half cycles of the power line voltage of said opposite polarity, and signal means at each of said carrier stations energized by the energization of the signal device responsive to impulses of carrier current received over said power line while the amplifier thereat is operative.

10. In a signaling system, a carrier current transmitter, a plurality of carrier current receivers, individual signal means controlled by each of said receivers, a transmission medium common to said transmitter and receivers for transmitting carrier current from said transmitter to all of said receivers, means for impressing an alternating current control voltage on said medium, means for controlling said carrier transmitter to transmit impulses of carrier current over said medium only during half cycles of one polarity of said control voltage, the frequency of said impulses being an integral submultiple of the frequency of said control voltage, and means in each of some but not all of said receivers for actuating the associated signal means responsive only to carrier current received through said medium during half cycles of said one polarity of said control voltage.

11. In a signaling system, a carrier current transmitter, a plurality of carrier current receivers, individual signal means controlled by each of said receivers, a transmission medium common to said transmitter and receivers for transmitting carrier current from said transmitter to all of said receivers, means for impressing an alternating current control voltage on said medium, means for controlling said carrier transmitter to transmit impulses of carrier current over said medium only during half cycles of one polarity of said control voltage and at an impulse frequency which is an integral submultiple of the frequency of said control voltage, means for controlling said carrier transmitter to transmit impulses of carrier current over said medium only during half cycles of the opposite polarity of said control voltage and at said impulse frequency, means in each of some but not all of said receivers for actuating the associated signal means responsive only to carrier current received through said medium during half cycles of said one polarity of the control voltage, and means in each of the remainder of said receivers for actuating the associated signal means responsive only to carrier current received through said medium during half cycles of said opposite polarity of the control voltage.

12. In a signaling system, a carrier current transmitter, a plurality of carrier current receivers, a transmission medium common to said transmitter and receivers for transmitting carrier current from said transmitter to all of said receivers, means for impressing an alternating current control voltage on said medium, means for controlling said carrier transmitter to transmit impulses of carrier current over said medium at a first impulse frequency which is an integral submultiple of the frequency of said control voltage and only during half cycles of one polarity of said control voltage, and means for controlling said carrier transmitter to transmit impulses of carrier current over said medium at another impulse frequency which is an integral submultiple of the frequency of said control voltage and only during half cycles of said one polarity of said control voltage.

13. In a signaling system, a carrier current transmitter, a plurality of carrier current receivers, a transmission medium common to said transmitter and receivers for transmitting carrier current from said transmitter to all of said receivers, means for impressing an alternating current control voltage on said medium, means for controlling said carrier transmitter to transmit impulses of carrier current over said medium at a first impulse frequency which is an integral submultiple of the frequency of said control voltage and only during half cycles of one polarity of said control voltage, means for controlling said carrier transmitter to transmit impulses of carrier current over said medium at said first impulse frequency and only during half cycles of the opposite polarity of said control voltage, means for controlling said carrier transmitter to transmit impulses of carrier current over said medium at another impulse frequency which is an integral submultiple of the frequency of said control voltage and only during half cycles of said one polarity of said control voltage, and means for controlling said carrier transmitter to transmit impulses of carrier current over said medium at said other impulse frequency which is an integral submultiple of the frequency of said control voltage and only during half cycles of said opposite polarity of said control voltage.

14. In a signaling system, a carrier current transmitter, a plurality of carrier current receivers, a transmission medium common to said transmitter and receivers for transmitting carrier current from said transmitter to all of said receivers, means for impressing an alternating current control voltage on said medium, means for controlling said carrier transmitter to transmit impulses of carrier current over said medium at a first impulse frequency which is an integral submultiple of the frequency of said control voltage and only during half cycles of one polarity of said control voltage, means for controlling said carrier transmitter to transmit impulses of carrier current over said medium at another impulse frequency which is an integral submultiple of the frequency of said control voltage and only during half cycles of said one polarity of said control voltage, individual signal means including a tuned ringer controlled by each of said receivers, and means in each of said receivers for actuating the associated signal means responsive only to carrier current received through said medium during half cycles of said one polarity of said control voltage, the ringer associated with each of some but not all of said receivers being tuned to respond only to carrier impulses received over said medium at said first impulse frequency and the ringer associated with each of the other receivers being tuned to respond only to carrier impulses received over said medium at said other impulse frequency.

15. In a signaling system, a carrier current transmitter, a plurality of carrier current receivers, a transmission medium common to said transmitter and receivers for transmitting carrier current from said transmitter to all of said receivers, means for impressing an alternating current control voltage on said medium, means for controlling said carrier transmitter to transmit impulses of carrier current over said medium at a first impulse frequency which is an integral submultiple of the frequency of said control voltage and only during half cycles of one polarity of said control voltage, means for controlling said carrier transmitter to transmit impulses of carrier current over said medium at said first impulse frequency and only during half cycles of the opposite polarity of said control voltage, means for controlling said carrier transmitter to transmit impulses of carrier current over said medium at another impulse frequency which is an integral submultiple of the frequency of said control voltage and only during half cycles of said one polarity of said control voltage, means for controlling said carrier transmitter to transmit impulses of carrier current over said medium at said other impulse frequency and only during half cycles of said opposite polarity of said control voltage, individual signal means including a tuned ringer controlled by each of said receivers, said receivers divided into four groups, means in each of the receivers of the first and second of said groups for actuating the associated signal means responsive only to carrier current received through said medium during half cycles of said one polarity of said control voltage, and means in each of the receivers of the third and fourth of said groups for actuating the associated signal means responsive only to carrier current received through said medium during half cycles of said opposite polarity of said control voltage, each of the ringers associated with receivers in said first and third groups being tuned to respond only to carrier impulses received over said medium at said first impulse frequency and each of the ringers associated with receivers in said second and fourth groups being tuned to respond only to carrier impulses received over said medium at said other impulse frequency.

16. In a telephone system, subscriber lines including party lines, a plurality of subscriber stations connected to each of said party lines, means for connecting calling and called lines, means for transmitting time coded impulses of ringing current of a particular frequency over one conductor of a called party line to ring certain of the stations on the line and for transmitting like time coded impulses of ringing current over the other conductor to ring the other stations on the line, a power line, a plurality of telephone subscriber stations connected to said power line, each of said power line subscriber stations comprising carrier transmitting and receiving means for transmitting and receiving voice and signal modulated carrier current over said power line, carrier terminal equipment connecting said power line to one of said party lines, and means including means in said carrier terminal equipment and means at each of said power line stations for signaling certain of said power line stations when ringing current is received by said carrier terminal equipment over one conductor of said one party line, and for ringing the other power line stations when ringing current is received by said carrier terminal equipment over the other conductor of said one party line.

ROBERT C. EDSON.
LESTER HOCHGRAF.

REFERENCES CITED

The following references are of record in the file of this patent:

UNITED STATES PATENTS

| Number | Name | Date |
|---|---|---|
| 2,108,909 | Vincent | Feb. 22, 1938 |
| 2,164,033 | Halligan | June 27, 1939 |
| 2,197,414 | Place | Apr. 16, 1940 |
| 2,294,905 | Honaman | Sept. 8, 1942 |
| 2,302,544 | Halligan | Nov. 17, 1942 |
| 2,378,326 | Rees | June 12, 1945 |
| 2,408,299 | Davis | Sept. 24, 1946 |
| 2,430,471 | Lang | Nov. 11, 1947 |